United States Patent
Liang et al.

(10) Patent No.: US 9,786,915 B2
(45) Date of Patent: Oct. 10, 2017

(54) ALL-SOLID STATE LITHIUM CARBON MONOFLUORIDE BATTERIES

(71) Applicant: UT-Battelle, LLC, Oak Ridge, TN (US)

(72) Inventors: Chengdu Liang, Knoxville, TN (US); Ezhiylmurugan Rangasamy, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 129 days.

(21) Appl. No.: 14/633,453

(22) Filed: Feb. 27, 2015

(65) Prior Publication Data

US 2015/0295241 A1 Oct. 15, 2015

Related U.S. Application Data

(60) Provisional application No. 61/977,901, filed on Apr. 10, 2014.

(51) Int. Cl.
| | |
|---|---|
| *H01M 4/58* | (2010.01) |
| *H01M 10/052* | (2010.01) |
| *H01M 10/0562* | (2010.01) |
| *H01M 10/058* | (2010.01) |
| *H01M 4/38* | (2006.01) |
| *H01M 4/583* | (2010.01) |
| *H01M 4/62* | (2006.01) |
| *H01M 4/133* | (2010.01) |
| *H01M 4/136* | (2010.01) |
| *H01M 4/1393* | (2010.01) |
| *H01M 4/1397* | (2010.01) |

(52) U.S. Cl.
CPC ......... *H01M 4/5815* (2013.01); *H01M 4/133* (2013.01); *H01M 4/136* (2013.01); *H01M 4/1393* (2013.01); *H01M 4/1397* (2013.01); *H01M 4/382* (2013.01); *H01M 4/5835* (2013.01); *H01M 4/625* (2013.01); *H01M 10/052* (2013.01); *H01M 10/058* (2013.01); *H01M 10/0562* (2013.01); *H01M 2300/0068* (2013.01)

(58) Field of Classification Search
CPC .. H01M 4/5815; H01M 10/052; H01M 4/382; H01M 4/5835; H01M 4/625; H01M 4/1397; H01M 10/058; H01M 4/133; H01M 4/136; H01M 4/1393; H01M 10/0562; H01M 2300/0068
See application file for complete search history.

(56) References Cited

U.S. PATENT DOCUMENTS

| | | | | |
|---|---|---|---|---|
| 2012/0126182 A1* | 5/2012 | Zhang | ................ | H01M 4/5835 252/507 |
| 2013/0177811 A1* | 7/2013 | Roffat | ................ | H01M 4/0433 429/231.2 |
| 2013/0295469 A1* | 11/2013 | Liang | .................... | H01M 4/134 429/335 |
| 2016/0233553 A1* | 8/2016 | Yamasaki | ............... | H01M 4/13 |

\* cited by examiner

*Primary Examiner* — Muhammad Siddiquee
(74) *Attorney, Agent, or Firm* — Fox Rothschild LLP

(57) ABSTRACT

A solid state lithium carbon monofluoride battery includes an anode comprising Li, a solid electrolyte, and a cathode including $CF_x$ and LPS. The cathode can also include a carbon compound. The solid electrolyte can include LPS. The LPS can include $\beta$-$Li_3PS_4$. The cathode LPS can include $\beta$-$Li_3PS_4$. A method of making a battery is also disclosed.

4 Claims, 6 Drawing Sheets

ALL-SOLID STATE LITHIUM CARBON MONOFLUORIDE BATTERIES

STATEMENT REGARDING FEDERALLY SPONSORED RESEARCH

This invention was made with government support under contract No. DE-AC05-00OR22725 awarded by the U.S. Department of Energy. The government has certain rights in this invention.

CROSS REFERENCE TO RELATED APPLICATIONS

This application is a non-provisional of U.S. Application No. 61/977,901 entitled "ALL-SOLID STATE LITHIUM CARBON MONOFLUORIDE BATTERIES" which was filed on Apr. 10, 2014.

FIELD OF THE INVENTION

This invention relates generally to lithium batteries, and more particularly to Li—$CF_x$ batteries.

BACKGROUND OF THE INVENTION

The invention of artificial cardiac pacemakers, radiofrequency identification devices (RFID), remote keyless systems and similar stand-alone devices represent a large demand for long standing, high capacity batteries that last for years or several tens of years without charge. Primary Li batteries cater to these applications and complement the secondary Li-ion batteries when the recharge of batteries is prohibited or not needed. In a typical battery, the individual components such as electrodes and electrolyte have their functions preset and do not overlap with one another.

The Li—$CF_x$ battery system offers one of the best energy densities with up to 7 times the capacity of $LiCoO_2$-based Li-ion system, a conventional Li-ion battery cathode and up to 2 times the capacity of thionyl chloride, the nearest energy dense primary cathode. Even at lower concentrations of fluorine, the Li—$CF_x$ system offers more capacity than the Li—$MnO_2$ system. Additionally, the Li—$CF_x$ system is extremely stable, offering excellent shelf life (>10 years) and minimal (<10%) self-discharge. A conventional Li—$CF_x$ battery uses an inert liquid electrolyte. The solvation process is an indispensable part of the electrochemical reactions that are described by the following equations:

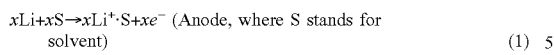
$x$Li+$x$S→$x$Li$^+$·S+$xe^-$ (Anode, where S stands for solvent)  (1)

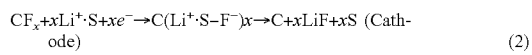
$CF_x$+$x$Li$^+$·S+$xe^-$→C(Li$^+$·S–F$^-$)$_x$→C+$x$LiF+$x$S (Cathode)  (2)

Limitations of this battery chemistry, such as 1) heat generation during the course of reaction, 2) volume expansion resulting from the crystallization and precipitation of LiF, 3) poor electrode kinetics and low electronic conductivity restricting the performance at high discharge rates, and 4) flammability concerns with organic electrolytes have restricted the widespread application of Li—$CF_x$ cells. These limitations are closely linked to the solvation process of Li—$CF_x$ batteries. The volume expansion of the cathode could result from the intercalation of solvent into the carbon during discharge coupled with the voids pillared by the LiF crystallization between graphene layers, following discharge. The high enthalpy of crystallization for LiF (26.91 kJ mol$^{-1}$), results in heat generation during the discharge reaction. A move away from the solvation chemistry would eliminate the volume expansion from solvent intercalation and result in the formation of amorphous LiF, minimizing the heat generation. Thus, the elimination of solvents is expected to be a fundamental improvement in current generation Li—$CF_x$ batteries. Solid-state Li-ion conductors offer a step away from the solvation chemistry while offering better mechanical properties, electrochemical and thermal stability. Nanoporous β-$Li_3PS_4$ (LPS) has been recently reported as an superb solid electrolyte that is stable with metallic lithium anode.

SUMMARY OF THE INVENTION

A solid state lithium carbon monofluoride battery, includes an anode comprising Li, a solid electrolyte, and a cathode including $CF_x$ and LPS. The cathode can also include a carbon compound. The solid electrolyte can include LPS. The electrolyte LPS can include β-$Li_3PS_4$. The cathode LPS can include β-$Li_3PS_4$. The carbon compound can include carbon black.

The cathode can have 10%-95% $CF_x$, 5%-70% LPS, and 0% to 50% carbon compound, based on the total weight of the cathode. The battery cathode can include amorphous LiF. The battery can have a capacity utilization greater than the theoretical capacity for a $CF_x$ cathode. The cathode and the solid electrolyte can include β-$Li_3PS_4$ and the battery can have a capacity utilization of greater than 865 mAh/g.

A solid state lithium carbon monofluoride battery can include an anode comprising Li, a solid electrolyte including β-$Li_3PS_4$, and a cathode including $CF_x$ and β-$Li_3PS_4$. The cathode can also include a carbon compound. The cathode can include 10%-95% $CF_x$, 5%-70% β-$Li_3PS_4$, and 0% to 50% carbon compound, based on the total weight of the cathode. The cathode can further include amorphous LiF. The battery can have a capacity utilization greater than the theoretical capacity for a $CF_x$ cathode. The battery can have a capacity utilization of greater than 865 mAh/g.

A method of making a battery can include the steps of providing a cathode including LPS and $CF_x$ to make a cathode, providing a solid electrolyte adjacent to the cathode, and providing an anode including Li with the solid electrolyte positioned between the cathode and the anode. The cathode can also include a carbon compound. The cathode can be provided by mixing the LPS and the $CF_x$, and optionally also the carbon compound. The cathode can include 10%-95% $CF_x$, 5%-70% LPS, and 0% to 50% carbon compound, based on the total weight of the cathode. The solid electrolyte can include LPS. The solid electrolyte and the cathode can include β-$Li_3PS_4$. The method can further include the step of cycling the battery to produce amorphous LiF. The method can include the step of cycling the battery to provide a capacity utilization greater than the theoretical capacity for a $CF_x$ cathode. The battery can be cycled to provide a capacity utilization greater than 865 mAh/g.

BRIEF DESCRIPTION OF THE DRAWINGS

There are shown in the drawings embodiments that are presently preferred it being understood that the invention is not limited to the arrangements and instrumentalities shown, wherein.

Figure 1A:
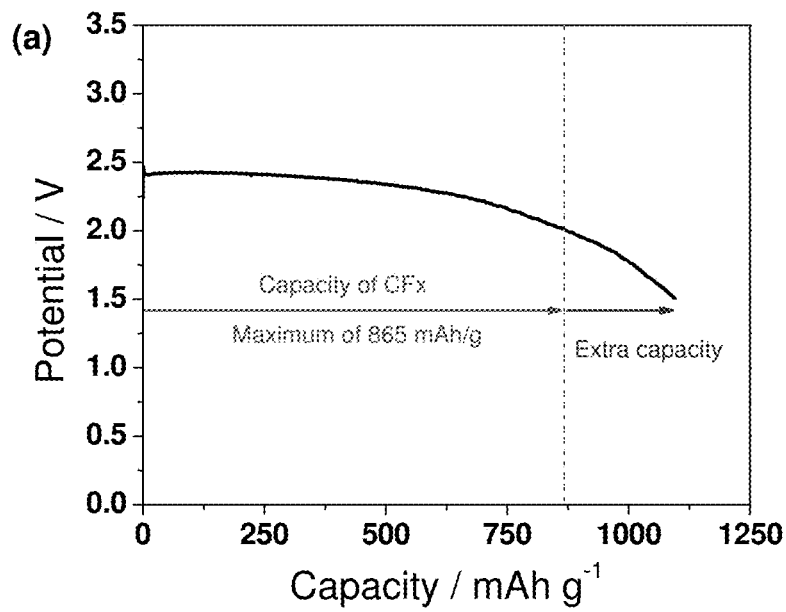
FIGS. 1(a) and 1(b) are graphs illustrating that bi-functional β-$Li_3PS_4$ confer additional capacity to Li—$CF_x$ batteries.

For a better understanding of the present invention, together with other and further objects, advantages and capabilities thereof, reference is made to the following disclosure and appended claims in connection with the above-described drawings.

DETAILED DESCRIPTION OF THE INVENTION

In a typical battery, electrodes deliver capacities less than or equal to the theoretical maxima of the electrode materials. The inert electrolyte functions solely as the ionic conductor without contribution to the cell capacity because of its distinct mono-function in the concept of conventional batteries. On the present invention the most energy-dense Li—CF$_x$ battery can provide a capacity exceeding the theoretical maximum of CF$_x$ with a solid electrolyte of Li$_3$PS$_4$ (LPS) that has dual functions: as the inert electrolyte at the anode and the active component at the cathode. Such a bi-functional electrolyte reconciles both inert and active characteristics through a synergistic discharge mechanism of CF$_x$ and LPS. Li$_3$PS$_4$ is known as an inactive solid electrolyte with a broad electrochemical window over 5 V. The synergy at the cathode is through LiF, the discharge product of CF$_x$, which activates the electrochemical discharge of LPS at a close electrochemical potential of CF$_x$. The multiple stable oxidation states (3+, 4+ and 5+) of P coupled with its 5+ oxidation state in LPS, makes it an appealing candidate for a bi-functional electrolyte. Therefore, the solid-state Li—CF$_x$ batteries output 126.6% energy beyond their theoretic limits without compromising the stability of the cell voltage. The extra energy comes from the electrochemical discharge of LPS, the inert electrolyte. This bi-functional electrolyte permits a change to the standard concept of conventional batteries and provides for the design of batteries with a high energy density.

The expendable nature of primary batteries permits a bi-functional design with the electrolyte, enabling it to function as the electrolyte and also as an electrode. A bi-functional electrolyte can greatly improve the capacity of primary batteries. Such a design places requirements on the electrolyte that even while becoming electrochemically active, it should remain stable with the other electrode at all times for the purpose of cell stability. Therefore, the activity of the bi-functional electrolyte should be localized at one electrode. It is essential that this activity is catalyzed and not spontaneous. The invention provides electrochemical activity in the electrolyte that is promoted by the product of discharge at the cathode; therefore no additional catalyst is needed although catalysts can be included within the scope of the invention. A bi-functional electrolyte for lithium batteries according to the invention should possess good ionic conductivity, be inherently stable with metallic Li anode and electrochemically activated by the cathodic product of discharge.

A solid state lithium carbon monofluoride battery, includes an anode comprising Li, a solid electrolyte, and a cathode including CF$_x$ and LPS. The solid electrolyte can include LPS. The electrolyte LPS can include β-Li$_3$PS$_4$. The cathode LPS can include β-Li$_3$PS$_4$.

A suitable LPS electrolyte should be non-reactive with the anode materials and should be non-reactive with the cathode materials except in the presence the LiF reaction product of the CF$_x$ cathode during discharge. The electrolyte should have other desirable attributes of an electrolyte such as stability and good ionic conductivity. A suitable LPS for the cathode mixture should be catalyzed by the LiF reaction products of the discharge reaction at the cathode. The LPS can be β-Li$_3$PS$_4$ or other stoichiometric variants of LPS such as Li$_x$P$_y$S$_z$ where x=2 to 4, y=1 to 2, and z=3 to 6 which is catalyzed by the reaction products. The ratio of LPS in the electrolyte versus the amount of LPS in the cathode mixture can vary.

The CF$_x$ can be any suitable CF$_x$ compound, where x=0.5 to 1.5.

The cathode can also include a carbon compound. The carbon compound can include carbon black, amorphous carbon, activated carbon, carbon nanotubes, carbon nanofibers, and graphite.

The cathode can have 10%-95% CF$_x$, 5%-70% LPS, and 0% to 50% carbon compound, based on the total weight of the cathode. The battery cathode can include amorphous or crystalline LiF from 0% to 50%.

The battery can have a capacity utilization greater than the theoretical capacity for a CF$_x$ cathode. The cathode and the solid electrolyte can include β-Li$_3$PS$_4$ and the battery can have a capacity utilization of greater than 865 mAh/g.

A solid state lithium carbon monofluoride battery can include an anode comprising Li, a solid electrolyte including β-Li$_3$PS$_4$, and a cathode including CF$_x$ and β-Li$_3$PS$_4$. The cathode can also include a carbon compound. The cathode can include 10%-95% CF$_x$, 5%-70% β-Li$_3$PS$_4$, and 0% to 50% carbon compound, based on the total weight of the cathode. The cathode can further include amorphous LiF. The battery can have a capacity utilization greater than the theoretical capacity for a CF$_x$ cathode. The battery can have a capacity utilization of greater than 865 mAh/g, or more than 1000 mAh/g.

A method of making a battery can include the steps of providing a cathode including LPS and CF$_x$ to make a cathode, providing a solid electrolyte adjacent to the cathode, and providing an anode including Li with the solid electrolyte positioned between the cathode and the anode. The cathode can also include a carbon compound. The cathode can be provided by mixing the LPS and the CF$_x$, and optionally also the carbon compound. The cathode can include 10%-95% CF$_x$, 5%-70% LPS, and 0% to 50% carbon compound, based on the total weight of the cathode. The solid electrolyte can include LPS. The solid electrolyte and the cathode can include β-Li$_3$PS$_4$. The method can further include the step of cycling the battery to produce amorphous LiF. The method can include the step of cycling the battery to provide a capacity utilization greater than the theoretical capacity for a CF$_x$ cathode. The battery can be cycled to provide a capacity utilization greater than 865 mAh/g.

LPS functions as an electrolyte with low interfacial resistance: As shown in FIG. 1a, the solid-state Li/LPS/CF$_x$ cells exhibit a stable potential profile with capacity utilization of 1095 mAh g$^{-1}$, that exceeds the 865 mAh/g theoretical capacity for the CF$_x$ cathode (when x=1). The stability in potential is notable and is characteristic of the Li—CF$_x$ system as observed in the earlier reports with wet cells. The solid-state Li—$CF_x$ cell exhibits an extremely low voltage delay of ≈15 mV in contrast to conventional liquid cells that typically exhibit a significant voltage delay of ~100 mV resulting from the low electronic conductivity of $CF_x$ when x≥0.9. Such an unusually low voltage delay of the $CF_x$ cathode is attributed to the good interfacial kinetics with LPS (as illustrated by EIS spectra) and excellent electronic conductivity from the C black. In fact, the interface resistance extracted from the EIS is less than half the resistance attributed to the bulk electrolyte.

Figure 1B:
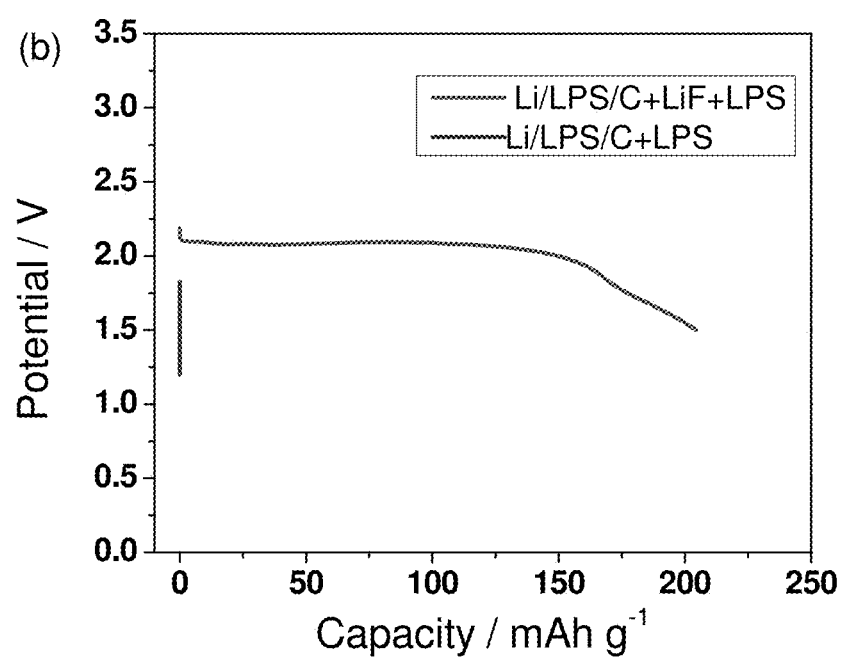

Activated discharge of LPS at the cathode is a demonstrated synergy of LPS and $CF_x$. A Li—$CF_x$ cell delivered a capacity higher than the theoretical maximum of 865 mAh $g^{-1}$. Among the three components of the cathode: $CF_x$, carbon, and LPS, carbon is inert, while $CF_x$ is theoretically limited. Therefore the extra capacity is attributed, without wishing to be bound by theory, to the discharge of LPS, which is contradictory to its 5V electrochemical window in literature. A control experiment of Li/LPS/C cell without the use of $CF_x$ in FIG. 1b proved that LPS and carbon did not exhibit any meaningful capacity even when the current density was reduced to 1.5 µA $cm^{-2}$. LPS was demonstrated to fulfil the role of an excellent electrolyte, which conducts lithium ions without electrochemical activity. The origin of the extra capacity was determined while the second control cell of Li/LPS/C+LiF was tested under identical conditions. When an inert component of LiF was added to the cathode, the LiF+C cell exhibited a capacity in excess of 200 mAh $g^{-1}$ (based on the mass of the cathode) with a stable cell voltage of 2.1 V (FIG. 1b). The capacity in the second control cell cannot come from LiF as it cannot be further reduced or C which is electrochemically inactive at the observed potentials. This experiment demonstrates that LiF activates the electrochemical discharge of LPS. It is believed, without wishing to be bound by theory, that the discharge function can be attributed to the electrochemical reduction of $P^{5+}$ to lower oxidation states. It is known that the $P^{5+}$ charge centers of $(PS_4)^{3-}$ can be reduced to $P^{4+}$ charge centers of $(P_2S_6)^{4-}$. Thus a transition from $Li_3PS_4$ to $Li_4P_2S_6$ is possibly triggered in the presence of LiF. However, the determination of the precise chemical compositions of the discharge mixture of LPS with $CF_x$ is complex due to the nature of the discharge mixture and the high air sensitivity for the electrolyte.

A conclusion can be made that LiF catalyzes an electrochemical activity in LPS that offers the additional capacity. LiF is a discharge product of $CF_x$ at the potential of 2.5V; thereby a synergistic relationship is now formed between $CF_x$ and LPS: the discharge of $CF_x$ at a slightly higher voltage (~2.5V) produces LiF that activates the discharge of LPS at 2.1 V. As a discharge product of $CF_x$, LiF is localized at the cathode. Therefore, at the anode side, LPS remains inert and functions solely as the electrolyte. At the cathode side, the synergistic interaction of $CF_x$ and LPS confers a dual function to LPS: this electrolyte first functions as the lithium-ion conductor that enables the discharge of $CF_x$ to LiF at 2.5V and in return the LiF activates the electrochemical discharge of LPS at 2.1V which functions as an active component of the cathode. Namely, the localized activity of LPS is triggered by the discharge of $CF_x$. Under routine cycling of a rechargeable battery system, any electrochemical activity of the electrolyte is unfavorable. However, in a primary cell, such contributions towards the capacity aid in prolonging the application life of the batteries by delivering additional capacity. The synergistic relationship between $CF_x$ and LPS converts an electrolyte that is conventionally an inactive component in capacity to an active one.

Primary batteries have a necessary requirement for long shelf life. Hence in such a synergistic relationship, it is necessary to ensure that this activity is unspontaneous. A sample of LiF/LPS mixture was high energy ball milled and allowed to sit under ambient conditions to investigate the possibility of a spontaneous chemical reaction between the two phases. The XRD pattern of the LiF/LPS mixture showed no change even after 30 days. The results of this test (FIG. 2) confirmed that the LiF/LPS mixture is electrochemically active instead of chemically reactive.

FIGS. 1(a) and 1(b) show that bi-functional $\beta$-$Li_3PS_4$ confers additional capacity to Li—$CF_x$ batteries. FIG. 1(a) shows a discharge profile for the Li/LPS/$CF_x$+C+LPS cell at a rate of C/170 and a current density of 5 µA $g^{-1}$. The discharge profile illustrates cell capacity exceeding the theoretical maximum of 865 mAh $g^{-1}$ for the $CF_x$ system. FIG. 1(b) shows discharge profiles of the Li/LPS/C+LPS and Li/LPS/C+LiF+LPS control cells at a current density of 5 µA $g^{-1}$. There is no electrochemical capacity observed from LPS in the absence of LiF confirming the LiF triggered activity of LPS.

Solid-state cells offer new reaction chemistry to the Li—$CF_x$ system: In a conventional Li—$CF_x$ cell, the solvation process in the liquid electrolytes causes volume expansion, heat generation, and safety concerns. The absence of a solvent will thus significantly change the electrochemical pathway. XRD analysis (FIG. 2a) of the pellets before and after discharge shows practically no change in crystallographic phases, more importantly does not reveal new phases. The observation of electrochemical capacity clearly suggests a phase change occurring within the cathode. An XPS analysis (FIG. 2b) of the cycled cathode surface reveals the presence of LiF. The measured binding energy of 685.54 eV for F 1s is in line with the reports for LiF, and with the measured binding energy of 685.4 eV for a LiF standard obtained from Sigma Aldrich. XRD is an effective representation of crystallographic phases within a system. The lack of concrete evidence for LiF in the XRD data and the presence of LiF in XPS clearly suggest that the discharge formed amorphous LiF. Upon close examination of XRD, minor evidence of an amorphous phase is observed between 36° and 48° that corresponds to the crystallographic reflections of LiF (highlighted regions in FIG. 2a). This provides further evidence for amorphous LiF. Since no solvation occurs in a solid-state Li-ion conductor, the reaction pathway for an all solid Li—$CF_x$ cell can be elucidated as

$$xLi \rightarrow xLi^+ + xe^- \text{ (Anode)} \quad (3)$$

$$CF_x + xLi^+ + xe^- \rightarrow C + xLiF_{Amorphous} \text{ (Cathode)} \quad (4)$$

The transition from solvation chemistry to solid-state chemistry has taken place under LPS without any performance setbacks. Additionally, amorphous LiF sidesteps the enthalpy of crystallization resulting in the absence of any measurable heat generated.

Figure 2A:
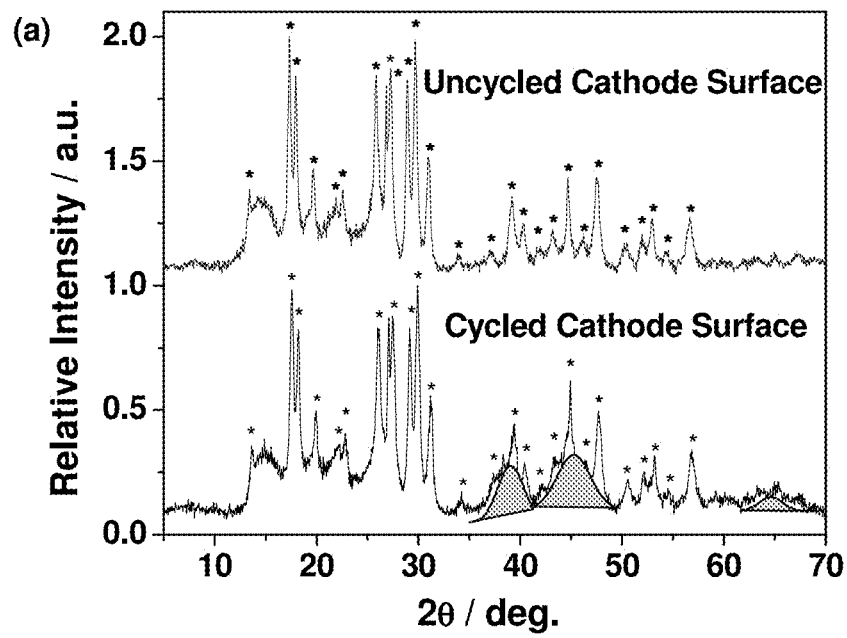
FIGS. 2(a) and 2(b) are graphs illustrating formation of a new electrochemical pathway in a solid-state cell.
Figure 2B:
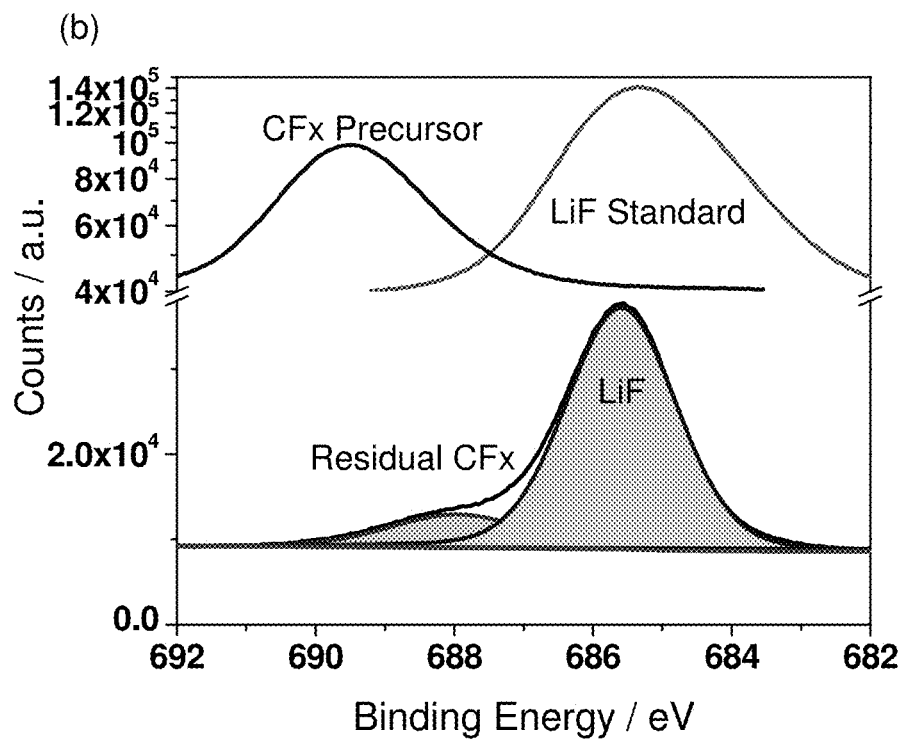

FIGS. 2(a) and 2(b) show formation of a new electrochemical pathway in a solid-state cell. FIG. 2(a) shows XRD data for the cathode surface before and after cycling. The peaks corresponding to $\beta$-$Li_3PS_4$ have been indexed with the symbol "*". After cycling there is no observation of a crystalline LiF phase under XRD. FIG. 2(b) shows XPS analysis of the cathode surface illustrates the formation of LiF along with trace CF thus indicating that the LiF is indeed amorphous.

Figures 3A, 3B, 3C, 3D, 3E, 3F:
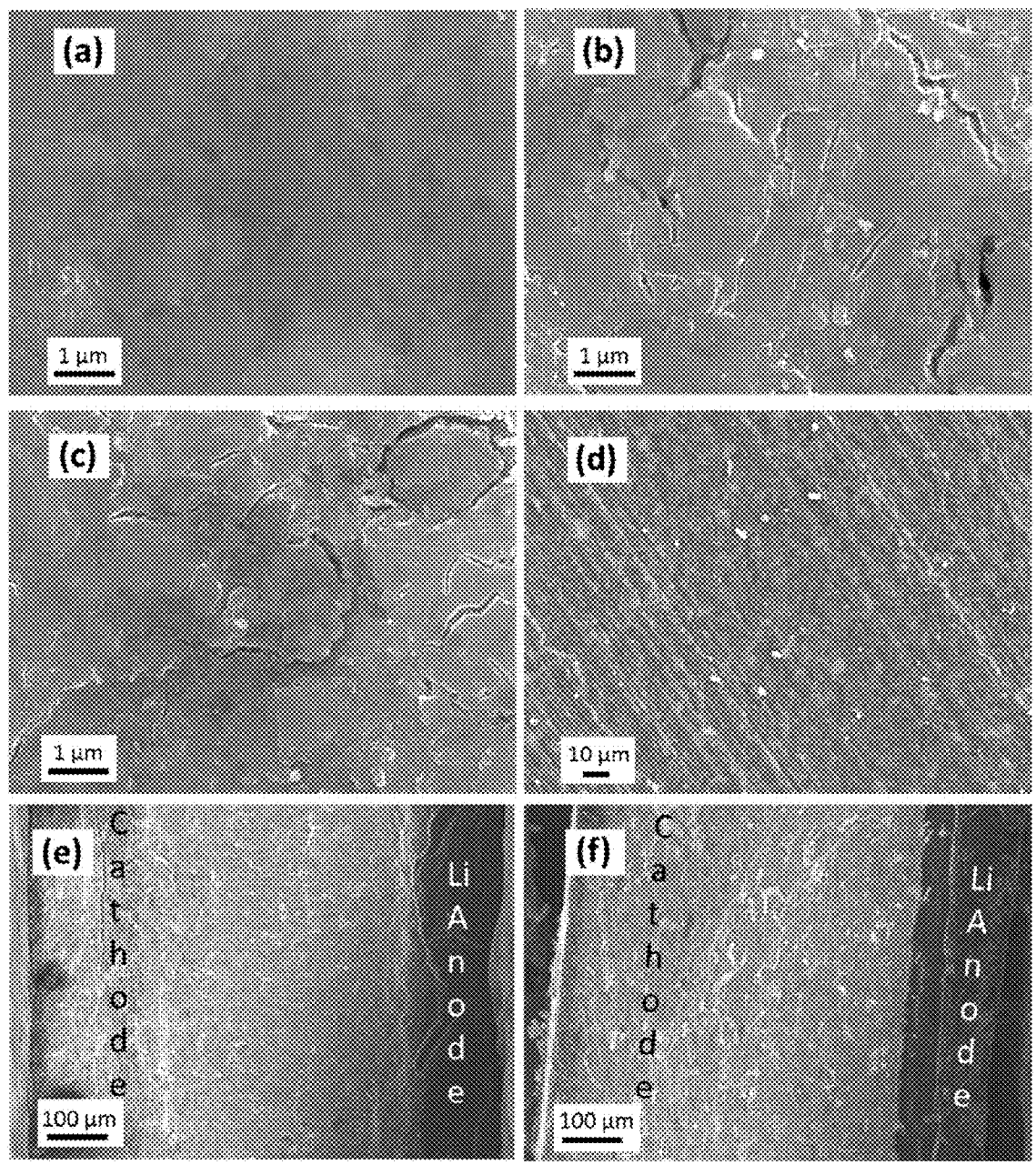
FIGS. 3(a)-3(f) are SEM images showing volume change after discharge.
Figure 4A:
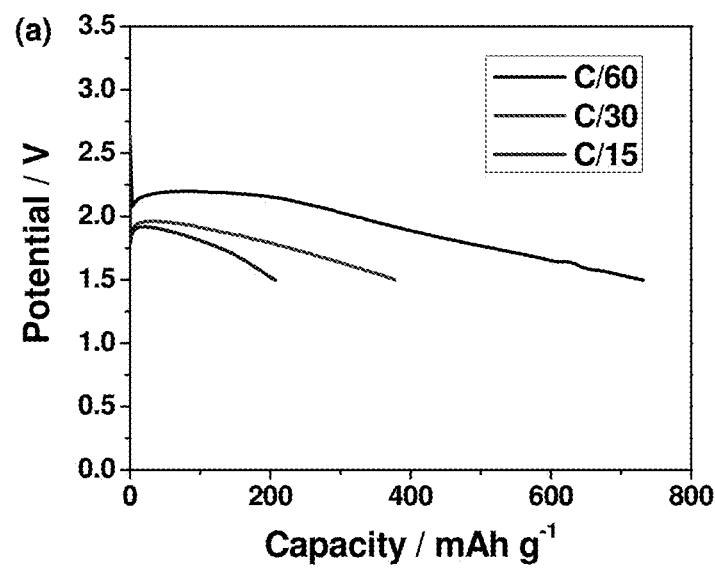
FIGS. 4(a) and 4(b) are graphs illustrating electrochemical performance as a function of rate and temperature.
Figure 4B:
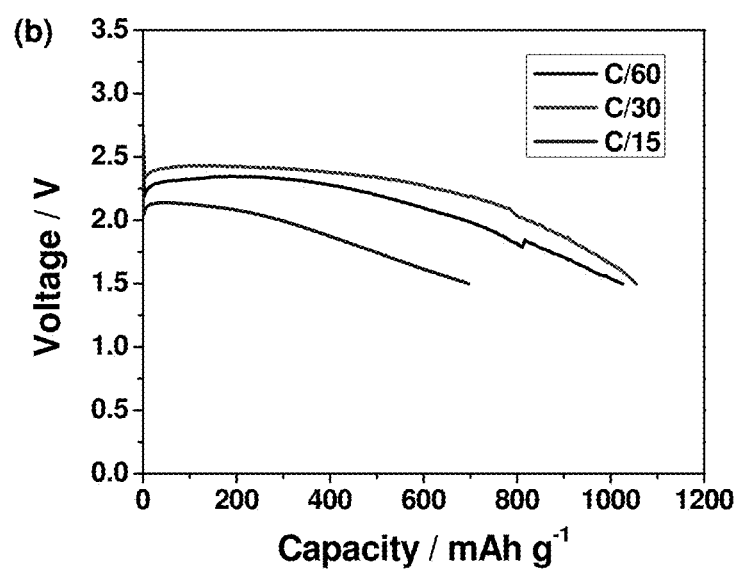

The formation of a new phase will always result in volumetric changes, because of the varying densities. The favorable elastic modulus of the solid-state electrolytes could be utilized to resist volume expansion. A 3D network encompassing C, $CF_x$ and LPS will hence aid in mitigating the residual volumetric concerns while providing a favorable conducting framework. A mixed conducting (ionic and electronic) framework is obtained by utilizing an hour long milling procedure between the $CF_x$ cathode and C-black and subsequent milling of the mixture with the soft LPS (FIG. 3). An elemental map of the electrode surface reveals a homogenous distribution of S and P (LPS) within a C and F matrix ($CF_x$+C). Typical solid-state mixing procedures result in inhomogenities and agglomerations, however the mechanical properties of C and $CF_x$ aid in obtaining good dispersion even under dry milling conditions. As a result, this 3D interconnected architecture provides a framework within the cathode composite that mitigates volume expansion. This is clearly observed under the SEM (FIG. 3) where an uncycled cathode has a pristine electrode surface (FIG. 3a), while the cycled cells show micron and sub-micron level textural changes (FIGS. 3b and 3c). However, these changes are not observed at lower magnifications (FIG. 3d), thus indicating that the integrity of the electrode is always preserved. Micron level textural changes are the mechanism for accommodating small volume changes within the cathode and are unavoidable due to the nature of the reaction. The interconnected network provides an ionic and electronic conducting framework that results in the exceptionally low 15 mV voltage delay. The interconnected network endorses the excellent rate performance of the Li—$CF_x$ cells (FIGS. 4a and 4b). Cross sectional SEM imaging (FIGS. 3e and 3f) of the cells prior and subsequent to cycling reveal the absence of macroscopic volumetric change on the cells. Due to the minimal volume change, the 3D interconnected network remains unaffected during the course of cell discharge. The formation of amorphous LiF coupled with the lack of significant volume change, thereby offers additional evidence that the crystallization of LiF is primarily the cause for volumetric changes observed in liquid Li—$CF_x$ cells.

FIGS. 3(a)-3(f) show microscopic imaging and measurements of volume change after discharge. SEM images of Li—$CF_x$ cells (FIG. 3(a)) before and (FIGS. 3(b), 3(c)) after C/30 electrochemical discharge at ambient temperature and 65° C. It is clearly evident that micron level cracks appear on the surface, as a result of the minimal volumetric expansion occurring during discharge. These cracks are not evident at lower magnifications (FIG. 3(d)), thus indicating that the macro level surface integrity is intact. Cross-sectional images of Li/LPS/$CF_x$ cell (FIG. 3(e)) after and (FIG. 3(f)) prior to cycling at ambient temperature. The thickness of the cell was measured at 878.7 μm prior to cycling and 878.1 μm after cycling. Thus the volumetric expansion issues observed with liquid electrolyte Li—$CF_x$ cells has been completely mitigated by moving to a solvent free electrochemical pathway. It is also observed that the LPS-Li interphase is homogenous subsequent to cycling. This is a result of the interfacial compatibility between LPS and Li anode.

Solid-state Li—$CF_x$ cells deliver good rate performance. While primary batteries are not typically subjected to high rate conditions, they do require moderate rate performance for certain applications. Hence the solid-state $CF_x$ cells were cycled at different rates and different conditions (FIG. 4) to evaluate their rate performance. The resulting data shows excellent rate performance, with the cells delivering higher than theoretical capacities and very minimal polarization.

Solid-state electrolytes follow an Arrhenius type behavior, thus exhibiting better transport properties at elevated temperatures. As a result, any heat generation during the discharge reaction will aid in considerably improving the cell performance. In order to demonstrate their high temperature performance, Li—$CF_x$ cells were cycled at ambient temperature and 65° C. As can be evidenced by the comparative data (FIGS. 4a and 4b), the heated solid-state cells deliver better performance with higher than theoretical capacities under rates as high as C/30. This can be attributed to two factors: 1) improvement in the Li-ion conductivity for the LPS electrolyte and 2) better interfacial kinetics resulting in much lower polarization losses. This is evident from the difference in operating potential between the cells discharged at ambient conditions and at elevated temperatures.

FIGS. 4(a) and 4(b) show electrochemical performance as a function of rate and temperature. Rate performance of the Li—$CF_x$ cells are illustrated at (FIG. 4(a)) ambient conditions and (FIG. 4(b)) at 65° C. It is clearly evident that the solid-state cells deliver an excellent rate performance as required for primary cells. The exceptional performance at elevated temperatures proves that any heat generation during the discharge reaction would only be favorable to the performance of the cell.

The results demonstrate a bi-functional utility of LPS electrolyte within the Li—$CF_x$ primary system. This electrochemical activity of LPS is triggered by LiF resulting in a tandem discharge of $CF_x$ and LPS through co-operative interactions of the electrolyte and electrode. The electrolyte maintains its stability with the Li anode at all times. The solid-state Li—$CF_x$ cells exhibit excellent capacity and good rate performance. The application of a solid electrolyte has resulted in a new non-solvated electrochemical pathway for the Li—$CF_x$ system. The formation of amorphous LiF coupled with the mitigated volume expansion and heat generation provides concrete evidence that the solid-state Li—$CF_x$ system exceeds the conventional liquid cell in all aspects.

Method of cell fabrication: The LPS was synthesized through an known procedure, while the $CF_x$ was obtained from a commercial source (Advance Research Materials Inc.). Carbon black from TIMCAL was used as the conducting additive for the cathode. Li foils purchased from Alfa Aesar were reduced in thickness to approx. 100 μm and utilized as the anode. Carbon-coated aluminum foils (from Exopack) was used as the current collectors for the cathode. Nickel foil was used as the current collector for the anode. The $CF_x$ and C black were mixed (6:4 ratio) in a High Energy SPEX mixer mill for 200 minutes in a HDPE vial with $ZrO_2$ milling media. Upon completion, a secondary mixing was done with the electrode mixture and LPS electrolyte in 7:3 (electrode mixture to LPS) ratio under the same conditions for 5 minutes. The resulting mixture was cold pressed into a pellet along with the LPS electrolyte and Li anode at 300 MPa. The C+LPS control cell was prepared with a 1:1 mixture of C:LPS milled for 30 minutes, while the C+LPS+LiF cell was prepared with a 4:3:3 mixture of C:LiF:LPS milled for 30 minutes. The cell fabrication of the control cells was carried out at the same conditions as the Li/LPS/C+LPS+$CF_x$ cells.

Methods of electrochemical and materials characterization: The cells were assembled in a 2 electrode Swagelok configuration and cycled at various current densities in a MACCOR 4000 Battery tester. Non-ambient condition testing was done in a MACCOR environmental chamber connected to the battery testing unit. Under such conditions, the cells were allowed to rest for 2 hours prior to electrochemical testing to reach thermal equilibria with the testing chamber. The capacity and the current density are normalized to the mass of active materials. In the Li—$CF_x$ cells the $CF_x$ is considered as the active material. In the control cells, the total mass of the cathode has been used for the normalization of current density and capacity. Electrochemical Impedance Spectroscopy (EIS) measurements were conducted using a 1260 Solartron Frequency Response Analyzer between 1 MHz and 0.1 Hz at the amplitude of 10 mV. Scanning Electron Microscopy (SEM) characterizations were conducted using a MERLIN Field Emission Scanning Electron Microscope (FE-SEM) from Carl Zeiss. For the purpose of characterizations before and after discharge, environment sensitive sample holders were utilized in conjunction with accurate X-ray elemental mapping. Crystallographic phase identification was conducted by using a PANalytical X'Pert Pro Powder Diffractometer with Cu Kα radiation. XRD samples were prepared in a glove box with Ar atmosphere. Kapton® films were used to seal quartz slides to exclude air contact. Qualitative analyses were conducted by the software of HighScore Plus, which is developed by PANalytical. X-ray photoelectron spectroscopy data were collected using a PHI 3056 XPS spectrometer with an Al Kα anode source operated at 350 W. Samples were transferred from an Ar-filled glove box to the XPS using a vacuum stage. The chamber pressure during measurement was kept below $10^{-8}$ Torr. High resolution data were collected with a pass energy of 23.5 eV with 0.05 eV step. Low resolution scans were collected with a pass energy of 93.5 eV with 0.5 eV step. The binding energy spectra were calibrated by assigning the binding energy of the C1s (C—C) to 284.8 eV to account for charging.

Figure 5:
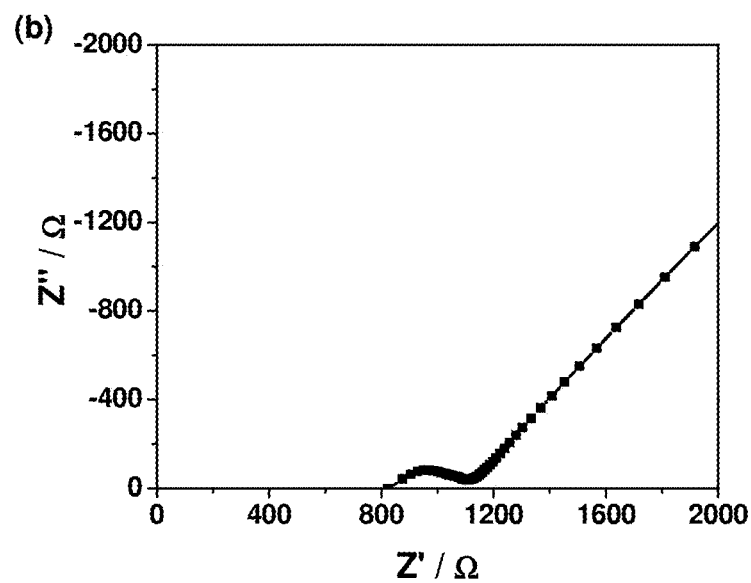
FIG. 5 is a graph showing room temperature Nyquist plot of a Li/LPS/CF$_x$ cell.

FIG. 5 shows a room temperature Nyquist plot of a Li/LPS/$CF_x$ cell. It is evident from the data that the charge transfer resistance is lower than the electrolyte resistance. The linear tail subsequent to the $R_{ct}$ resembles a Warburg type diffusion tail and hence diffusion limited system. The good electronic conductivity achieved in cell fabrication thus mitigates any electronic effects within the cell.

Figure 6:
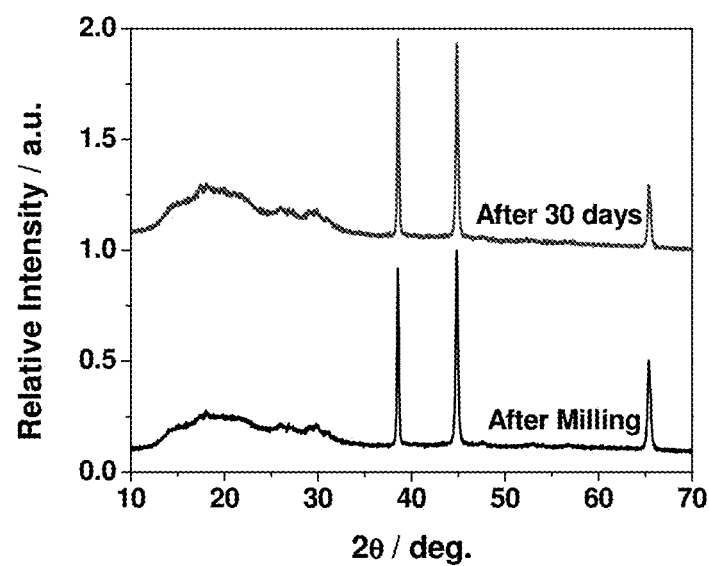
FIG. 6 is a graph showing XRD data of a LiF+LPS sample.
Figures 7A, 7B, 7C, 7D:
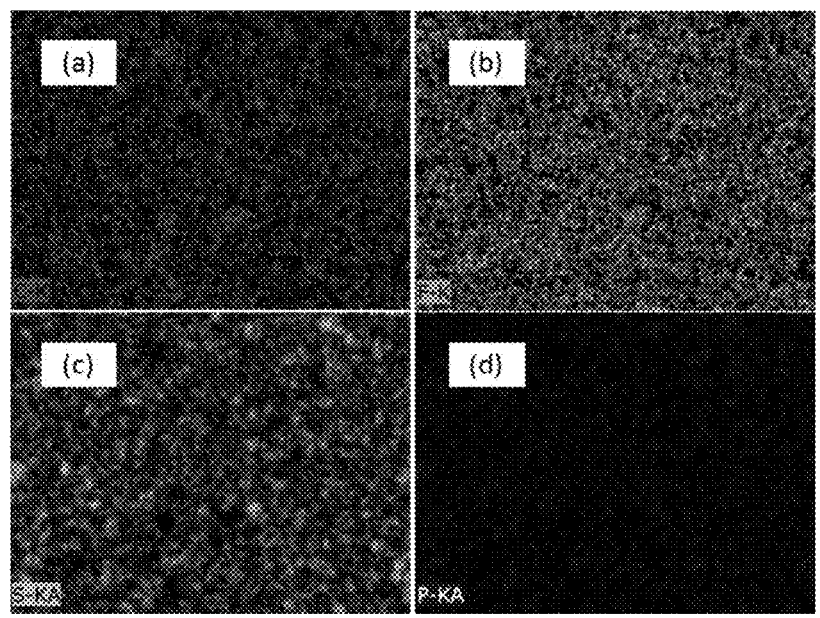
FIGS. 7(a)-7(d) are elemental maps of, respectively, C, F, S and P within the CF$_x$ cathode observed under EDS.

FIG. 6 shows XRD data of a LiF+LPS sample (1:1) milled in a high energy ball mill with a powder to ball mass ratio of 1:30 for 10 minutes and allowed to sit for 30 days. It is evident that there is no chemical reaction between LPS and LiF under standby conditions thus confirming that the new synergistic relationship between LiF (discharge product of $CF_x$) and LPS will not affect the shelf life of the cell.

FIGS. 7(a)-7(d) show, respectively, elemental maps of C, F, S and P within the $CF_x$ cathode observed under EDS. Homogenous mixing of LPS (as indicated by the P and S), C, and $CF_x$ is achieved at the cathode.

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the breadth of the range.

This invention can be embodied in other forms without departing from the spirit or essential attributes thereof, and accordingly, reference should be had to the following claims to determine the scope of the invention.

We claim:

1. A solid state lithium carbon monofluoride primary battery, comprising:
   an anode comprising Li;
   a solid electrolyte comprising β-$Li_3PS_4$;
   a cathode comprising carbon compound, $CF_x$, and β-$Li_3PS_4$;
   wherein the battery has a capacity utilization of greater than 865 mAh/g, and greater than the theoretical capacity for a $CF_x$ cathode.

2. The battery of claim 1, wherein the cathode comprises 10%-95% $CF_x$, 5%-70% β-$Li_3PS_4$, and 0% to 50% carbon compound, based on the total weight of the cathode.

3. The battery of claim 1, wherein the cathode further comprises amorphous LiF.

4. The battery of claim 1, wherein the carbon is carbon black.

* * * * *